United States Patent Office 3,475,203
Patented Oct. 28, 1969

3,475,203
HYDROPHOBIC FILM RENDERED ANTI-
STATIC BY PHENOL-FORMALDEHYDE
RESIN DERIVATIVES
Margaret L. Clachan, Patrick T. McGrail, Richard G. Turner, and Basil R. Shephard, Brantham, Manningtree, England, assignors to Bexford Limited, Brantham, Manningtree, England, a British company
No Drawing. Filed Oct. 7, 1965, Ser. No. 493,869
Claims priority, application Great Britain, Oct. 21, 1964, 42,950/64
Int. Cl. B44d 1/24, 1/14
U.S. Cl. 117—138.8       3 Claims

ABSTRACT OF THE DISCLOSURE

A film product which comprises a film base of plastics material of hydrophobic character, e.g. cellulose acetate, having a layer thereon which comprises, as an antistatic agent, a compound of the formula $$R-(O-A-SO_3M)_n$$

where R is the residue of a phenol-formaldehyde resin, A represents a chain of at least 3 and at most 4 methylene groups, M is hydrogen or alkali and $n$ is an integral number. The film base may also carry a colliod layer, e.g. gelatin, comprising 1.0 to 25% by weight of the said compound.

---

This invention relates to the treatment of films of plastics which may already bear coatings on one or both sides, to render them less liable to accumulate static electricity during processing or use, and to film products having a reduced tendency to accumulate static electricity. The invention further relates to new antistatic agents.

It is well known that hydrophobic films accumulate static electricity in handling processes such as reeling, unwinding or passage over rollers, during which there is, in general, rubbing of the film or separation of surfaces. The presence of static electricity on the films gives rise to many undesirable effects. These include fire hazard, sticking of sheets of the film either together or to other surfaces, accumulation of dirt and, especially in photographic film, marking or fogging of the emulsion.

Treatment of the surface of the films with an agent which increases the electrical conductivity is the usual method of avoiding static accumulation. In some cases the applied conductive coating may be supercoated with another layer or layers and the final assembly still retains an increased electrical conductivity and antistatic behaviour.

Many antistatic agents are known both of simple chemical and polymeric nature. They include simple inorganic salts, salts of carboxylic or sulphonic acids, amine or quaternary salts and other substances of ionic or highly polar character. Many of these agents although effective as antistatics, show defects such as presence of colouration, failure to adhere to the film or foil, failure to form a coherent layer on the film, lack of persistence or insufficient antistatic effect, excessive hydroscopicity and/or stickiness during use at temperatures up to 100° C. Furthermore, for photographic purposes, the antistatic agent must not effect the sensitometric behaviour of the film.

It is an object of the present invention to provide a new class of chemical compounds which are valuable antistatic agents for hydrophobic films and which, so used, avoid or substantially avoid the disadvantages of prior art antistatic agents. It is a further object of the invention to provide new films of plastics materials which have antistatic properties.

According to a first feature of the present invention there are provided, as new chemical compounds, compounds of the general Formula I:

$$R-(O-A-SO_3M)_n \qquad I$$

where R is the residue of a phenol formaldehyde resin, A is a divalent aliphatic grouping, M is a hydrogen atom or an atom of an alkali metal or an ammonium or substituted ammonium radical and $n$ is an integral number.

These compounds, as hereinafter described, are valuable antistatic agents.

According to a further feature of the invention there is provided a process for the production of compounds of general Formula I which comprises reacting, in an alkaline medium, a phenol-formaldehyde resin containing free hydroxy groups and a cyclic sulphonic ester.

Suitable discyclic sulphonic esters are, for example, 1:3 propane sultone and 1:4-butane sultone.

The resin used may be of the resol or novolak type, prepared in a soluble form from phenol, or a nuclear substituted phenol, and formaldehyde. Such products are readily available commercially, examples being those sold under the names Bakelite R5468/1, Bakelite R17620 and Crayvallac 231.

Resols may be cross-linked on heating especially in the presence of acid catalysts.

Novolaks may be cross linked by the addition of further formaldehyde or methylol compound. These methods of cross-linking may also be applied to the sulpho alkyl derivatives of the resins of Formula I.

The following example will serve to illustrate the production of a sulpho alkyl resin according to the invention.

EXAMPLE I

Bakelite resin R5468/1 (10.7 g.) was dissolved in methanol (100 ml.) and a solution of sodium (2.3 g.) in methanol (15 ml.) was added. A solution of 1:3-propane sultone (12.2 g.) in methanol (20 ml.) was added dropwise over 1 hour to the stirred mixture maintained under reflux. A pale yellow precipitate was formed towards the end of the addition of propane sultone. The mixture was heated and refluxed with stirring for a further 12 hours. Part of the methanol (50 ml.) was removed by distillation and, after cooling, the precipitate was filtered off, washed with methanol and dried in vacuo.

The product was a very pale yellow powder (20 g.) which has a sulphated ash content of 25.4%. An aqueous methanolic solution of the material gave a clear film on evaporation.

The above reaction may be represented as follows;

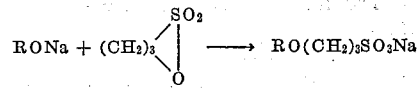

where R is the residue of the phenolic resin.

According to a further feature of the invention there is provided film base which comprises film of plastics material of hydrophobic character having a layer thereon which consists of or contains, as an antistatic agent, a compound of general Formula I.

Films coated with a thin layer of antistatic agents of the type described above may be used either directly or after further coating for various technological purposes. The antistatic agents may also be applied to films of plastics to achieve a temporary antistatic effect during further processing, the conductive layer being subsequently washed off or otherwise rendered ineffective.

The antistatic agents may be applied to the surface of the films from aqueous solutions or from solutions in water-miscible solvents containing small proportions of water. A suitable concentration of antistatic agent found to give satisfactory results is 0.1–5.0% w./v. For optimum wetting properties other anionic, cationic or non-ionic surface active substances may be added to the solutions. Inorganic salts such as lithium nitrate or calcium chloride may be added to the solutions of the antistatic agents of the present invention to supplement their effect if needed. Supplementary film-forming substances such as gelatin or synthetic resins or humectants may also be added.

It is frequently desired to coat a film of plastic with a layer of colloid composition especially designed for a particular technological purpose. This layer may be for example a layer of gelatin designated to be receptive in adhesion to a further coating of a gelatino-silver halide photographic emulsion. Either of these layers may be easily rendered antistatic in behaviour by addition of about 1.0–25.0% by weight on solids content of the agents of the present invention. Similarly other coatings for other purposes such as coatings designated to give a drafting surface or coatings designed for heat-sealing purposes may be rendered antistatic.

The following examples will serve to illustrate this aspect of the invention. In these examples films coated with antistatic agents were equilibriated at 20° C. and 60% relative humidity before measurement of their surface resistivity in ohms per square. Treated films having surface resistivity of between $10^7$ and $10^{11}$ ohms/sq. generally have satisfactory antistatic behaviour in subsequent processing or use.

EXAMPLE 2

An antistatic agent prepared by the reaction of a Novolac resin, derived from p-chlorophenol, with propane sultone as described above, was dissolved in 15% v./v. water in methanol to give a 0.4% w./v. solution. This solution was applied by means of a doctor roller to the secondary cellulose acetate side of a photographic film consisting of a cellulose triacetate base, bearing on both sides a layer of secondary cellulose acetate, and on one side additionally, a layer of gelatin. After drying the film had a surface resistivity of $3.0 \times 19^9$ ohms/square on the treated side, whereas untreated film showed a surface resistivity $>10^{12}$ ohms/square.

The antistatic properties of the treated base remained unchanged when the gelatin side was coated with gelatino-silver halide emulsion.

EXAMPLE 3

An antistatic agent was prepared by the reaction of Bakelite R5468/1 resin with propane sultone as described above. A 0.5% w./v. solution was made in a mixed solvent consisting of 15% w./v. water in methanol and applied to photographic film base as described in Example 2. The film had a surface resistivity of $4.2 \times 10^8$ ohms/square.

EXAMPLE 4

An antistatic resin was prepared by the method described using Crayvallac 231 as a reactant and the product was coated on to a photographic film base as in Example 2. The treatment film had a surface resistivity of $1.1 \times 10^9$ ohms/square.

EXAMPLE 5

An antistatic agent was prepared by the reaction of propane sultone with a resol (Bakelite R17620) and coated on to a photographic film base as in Example 2 from a solution containing 0.5% w./v. antistatic agent and 0.05% p-toluene sulphonic acid in a solvent mixture consisting of 15% v./v. water in methanol. After heating the film for 30 minutes at 70° C., the treated side had a surface resistivity of $5.0 \times 10^8$ ohms/square and $9.0 \times 10^8$ ohms/square after washing with water.

EXAMPLE 6

The antistatic agent of Example 2 was prepared as a 0.4% w./v. solution in a mixture of 15% v./v. water in methanol. This was coated on to a photograpihc film consisting of a cellulose triacetate base, bearing a secondary cellulose acetate layer and a gelatin layer on both sides. The surface resistivity of the treated film was $4.4 \times 10^9$ ohms/square.

EXAMPLE 7

A 0.4% w./v. solution of the antistatic agent described in Example 3 was prepared in 10% water in methanol. The solution was coated on to polyethylene terephthalate film, bearing a drafting surface comprising a layer of plasticised nitrocellulose plus finely divided silica. After drying, the drafting film had excellent antistatic properties with a surface resistivity of $7.0 \times 10^6$ oms/square.

EXAMPLE 8

A similar solution was prepared and coated on to drafting film using the antistatic described in Example 4. The surface resistivity of the film was $1.0 \times 10^9$ ohms/square.

EXAMPLE 9

A solution was prepared of the antistatic described in Example 3, consisting of 1.0 g. of resin, 5 ml. of Texilac W602 DP (Scott Bader Ltd.), 90 ml. of methanol and 10 ml. of water. After coating on to a drafting film, the surface resistivity was $4.0 \times 10^8$ ohms/square and the film had good pencil and ink-take behaviour.

EXAMPLE 10

A solution of the antistatic described in Example 3 was prepared in a solvent mixture comprising 15% v./v. water in methanol. The solution also contained 0.05% w./v. sodium lauryl sulphate. When applied to a polyethylene terephthalate film (Melinex-ICI) the surface resistivity after drying was $5.6 \times 10^7$ ohms/square. The untreated film had a surface resistivity of $>10^{14}$ ohms/square.

EXAMPLE 11

The antistatic agent described in the Example 3 (0.5 g.) and Cationic S.P. (0.03 g. American Cyanamid Co.) were dissolved in 100 ml. of 15% v./v. water in methanol and coated on to a cellulose triacetate film. After drying, the surface resistivity of the film on the treated side was $1.0 \times 10^8$ ohms/square.

EXAMPLE 12

A solution was prepared of the antistatic agent described in Example 3 (0.5 g.), lithium nitrate (0.5 g.), glycerol (0.25 g.), methanol (90 ml.) and water (10 ml.). A photographic film base of polyethylene terephthalate, prepared for application of a light-sensitive silver halide emulsion and already bearing a gelatin layer, was coated with the antistatic solution and gave after equilibration at 60% R.H. a surface resistivity of $3.0 \times 10^8$ ohms/square.

No defects caused by static discharge were found during or after application of the gelatino-silver halide emulsion.

We claim as our invention:

1. A film product which comprises a film base of plastics material of hydrophobic character having a layer thereon which comprises, as an antistatic agent, a compound of the formula

where R is the radical obtained by removing hydroxy hydrogen from a free hydroxy group—containing a phenol-formaldehyde resin selected from the group consisting of resol and novalak type phenol-formaldehyde condensation products, A represents a chain of at least 3 and at most 4 methylene groups, M is selected from the class consisting of hydrogen and alkali metal atoms, and $n$ is an integral number.

2. A film product according to claim 1 wherein the film base carries, as said layer, a colloid layer comprising 1.0 to 25% by weight of the said compound.

3. A film product according to claim 1 wherein the film base carries, as said layer, a gelatin layer comprising 1.0 to 25% by weight of the said compound.

References Cited

UNITED STATES PATENTS 2,461,474  2/1949  Kaszuba _____ 117—138.8

WILLIAM D. MARTIN, Primary Examiner

THEODORE G. DAVIS, Assistant Examiner

U.S. Cl. X.R.

117—34, 68, 76, 139.5, 144